United States Patent [19]

Afshar

[11] Patent Number: 4,734,854

[45] Date of Patent: Mar. 29, 1988

[54] SYSTEM FOR GENERATING SOFTWARE SOURCE CODE COMPONENTS

[75] Inventor: Siroos K. Afshar, Manalapan, N.J.

[73] Assignees: American Telephone and Telegraph Company, New York, N.Y.; AT&T Information Systems Inc., Morristown, N.J.

[21] Appl. No.: 785,787

[22] Filed: Oct. 8, 1985

[51] Int. Cl.[4] .................................................. G06F 1/00

[52] U.S. Cl. ...................................... 364/200; 364/300

[58] Field of Search ................. 364/200 MS File, 300

[56] References Cited

U.S. PATENT DOCUMENTS 4,463,423 7/1984 Potash et al. ...................... 364/300

*Primary Examiner*—Raulfe B. Zache

*Attorney, Agent, or Firm*—David H. Tannenbaum; David R. Padnes

[57] ABSTRACT

A system has been devised that allows commonly used software components to be designed and developed only once, and reused many times in different applications with different operational contexts and requirements. The system includes a language for the specification of software components in a context-independent generic fashion, a compiler for the specification language and a program for generating concrete software components to work in a specific context.

13 Claims, 22 Drawing Figures

{description of the GPC} 201

%%

{declarations of parameters, services, etc.}

%%

{implementation programs} 205

FIG. 3

300 type *identifier* { = %{ *default* %} } parameter; 301 value %{ *cast* %} *identifier* { = %{ *default* %} } parameter;

option *identifier* parameter;

operation %{ *cast* %} *identifier* { = %{ *default* %} } parameter;

prose *identifier* parameter; 305

FIG. 4

400 type *identifier* service; 401 value %{ *cast* %} *identifier* service;

operation %{ *cast* %} *identifier* service;

prose *identifier* service; 404

*identifier* hidden;

FIG. 6

```
                                                                  ┌600
 option                    LINK                 parameter;   601
 type                      node=%{ int* %}      parameter;
 operation   %{ int %}     _hashfnc             service;
 value       %{ unsigned %} t_size              parameter;
 prose                     _CODE_               service;
                           Always               hidden;     606
```

FIG. 7

```
                                                           ┌700
 service_name { requires identifier } is instructions;
```

FIG. 8

```
                                                           ┌800
            replace %{ C_segment %}
```

FIG. 9

```
                                                           ┌900
       append { once | multiple } %{ C_segment %}
```

FIG. 10

```
                                                           ┌1000
       header { once | multiple } %{ C_segment %}
```

FIG. 11

1100 if ( *condition* ) then *instructions* endif 1101 if ( *condition* ) then *instructions* else *instructions* endif 1102

*identifier* 1201

! *identifier*

*identifier* == *string*

*identifier* != *string* 1204

```
node requires Always is                1301
  replace %{ $0$ %}
  if( LINK == SINGLY ) then
    header once %{
      typedef struct Node {            1305
        struct Node *next;
        $data$
      } $node$;
    %}
  else                                 1310
    header once %{
      typedef struct Node {
        struct Node *next;
        struct Node *prev;
        $data$ Data;                   1315
      } $node$;
    %}
  endif
;                                      1319
```

Figures 14, 15:
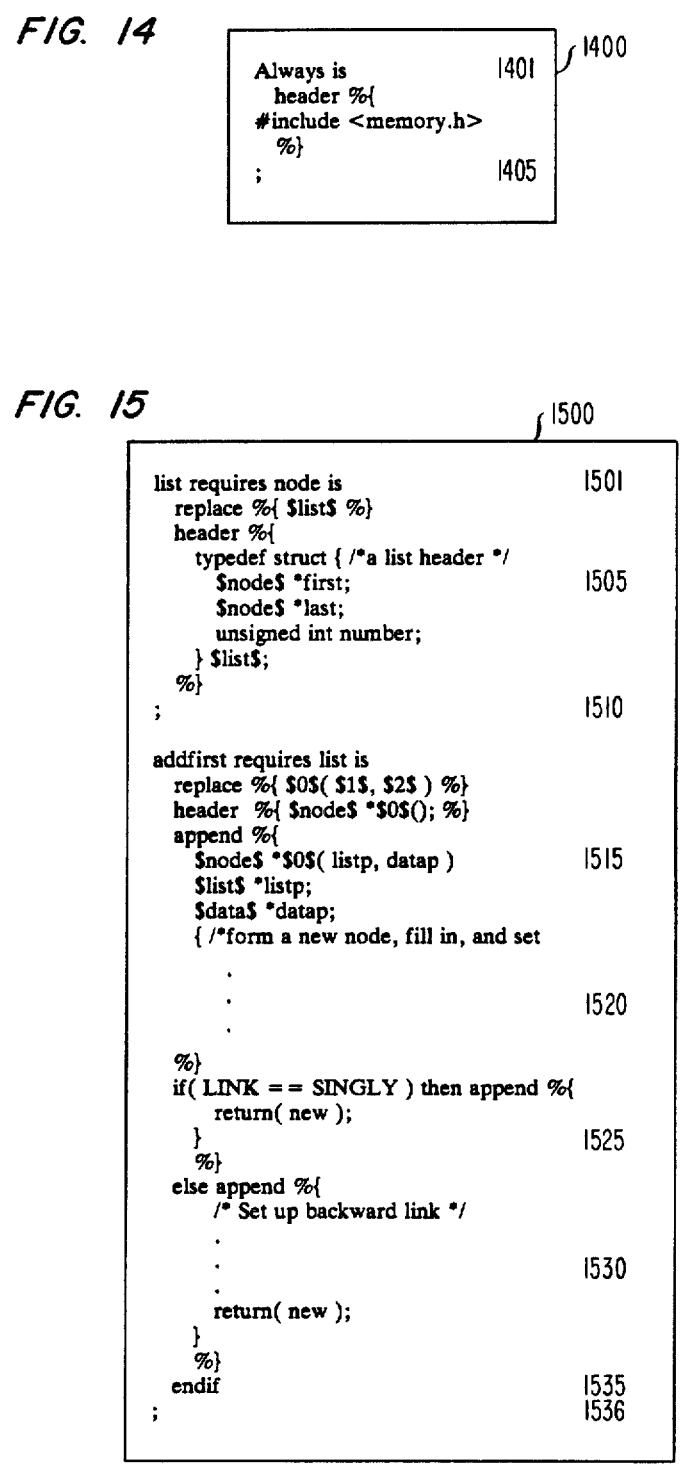

```
Always is
  header %{
#include <memory.h>
  %}
;
```

```
list requires node is
  replace %{ $list$ %}
  header %{
    typedef struct { /*a list header */
      $node$ *first;
      $node$ *last;
      unsigned int number;
    } $list$;
  %}
;

addfirst requires list is
  replace %{ $0$( $1$, $2$ ) %}
  header  %{ $node$ *$0$(); %}
  append %{
    $node$ *$0$( listp, datap )
    $list$ *listp;
    $data$ *datap;
    { /*form a new node, fill in, and set
        .
        .
        .
  %}
  if( LINK == SINGLY ) then append %{
      return( new );
    }
    %}
  else append %{
      /* Set up backward link */
      .
      .
      .
      return( new );
    }
    %}
  endif
;
```

```
forall is
  replace %{
    {
    $data$ *$2$;
    $node$ *cursor;
    for( cursor = $1$->first; cursor != NULL;
      cursor = cursor->next ) {
      $2$ = &(cursor->Data);
      $3$ /*Execute the segment */
    }
    }
  %}
;
```

```
#instance gpc_name( args )
```

```
#instance listhndlr( data = MyElementType,
                     list = MyListType,
                     addafter = ADD
                   )
```

```
#instance listhndlr( data = %{ struct MyNode {
                                  struct MyNode    *next;
                                  int              number;
                               }
                             %}
                   )
```

Figures 20, 21:
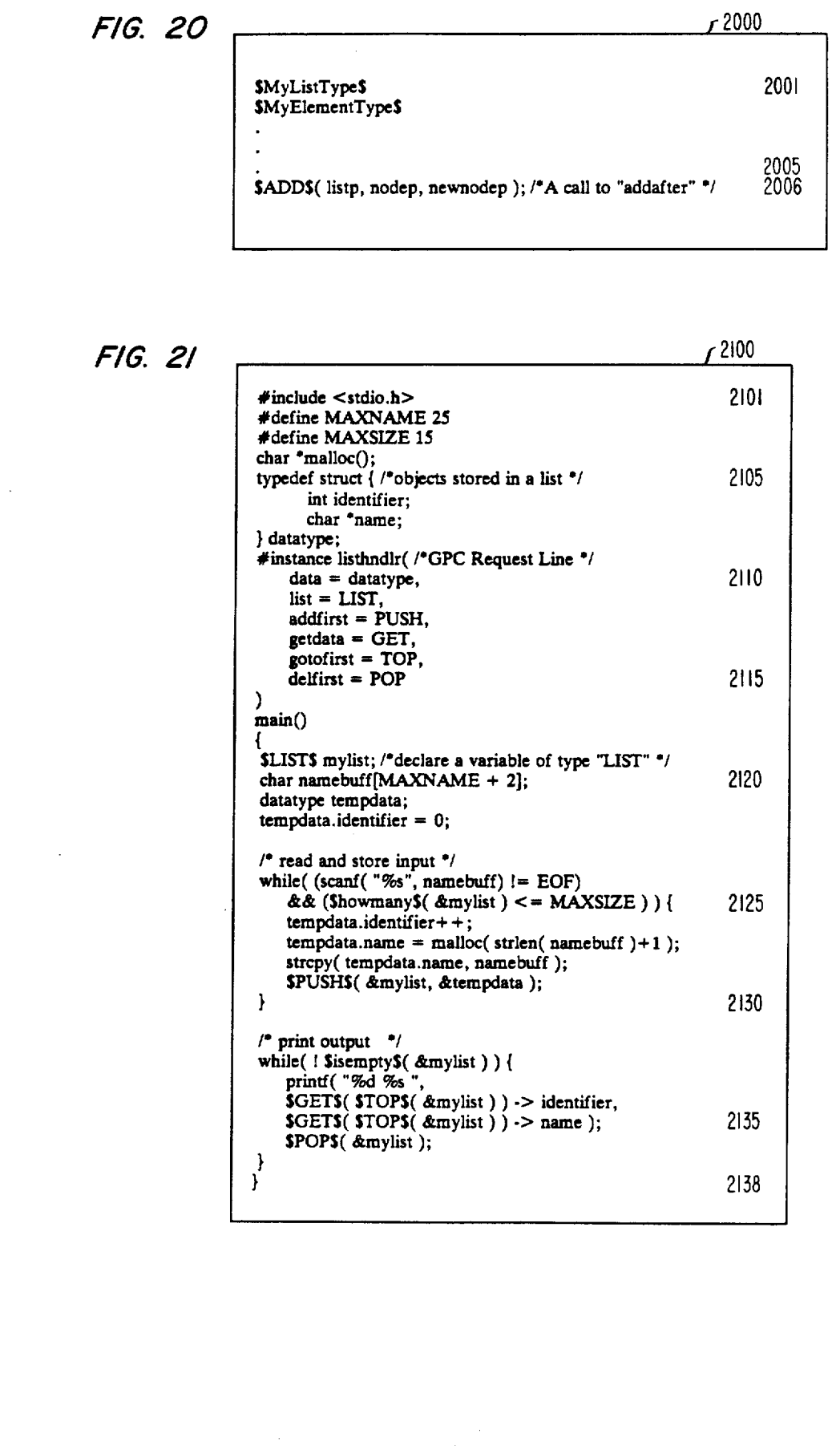

```
$MyListType$
$MyElementType$
.
.
.
$ADD$( listp, nodep, newnodep ); /*A call to "addafter" */
```

```
#include <stdio.h>
#define MAXNAME 25
#define MAXSIZE 15
char *malloc();
typedef struct { /*objects stored in a list */
        int identifier;
        char *name;
} datatype;
#instance listhndlr( /*GPC Request Line */
      data = datatype,
      list = LIST,
      addfirst = PUSH,
      getdata = GET,
      gotofirst = TOP,
      delfirst = POP
)
main()
{
 $LIST$ mylist; /*declare a variable of type "LIST" */
 char namebuff[MAXNAME + 2];
 datatype tempdata;
 tempdata.identifier = 0;

 /* read and store input */
 while( (scanf( "%s", namebuff) != EOF)
      && ($howmany$( &mylist ) <= MAXSIZE ) ) {
      tempdata.identifier++;
      tempdata.name = malloc( strlen( namebuff )+1 );
      strcpy( tempdata.name, namebuff );
      $PUSH$( &mylist, &tempdata );
 }

 /* print output  */
 while( ! $isempty$( &mylist ) ) {
      printf( "%d %s ",
      $GET$( $TOP$( &mylist ) ) -> identifier,
      $GET$( $TOP$( &mylist ) ) -> name );
      $POP$( &mylist );
 }
}
```

Figure 22:
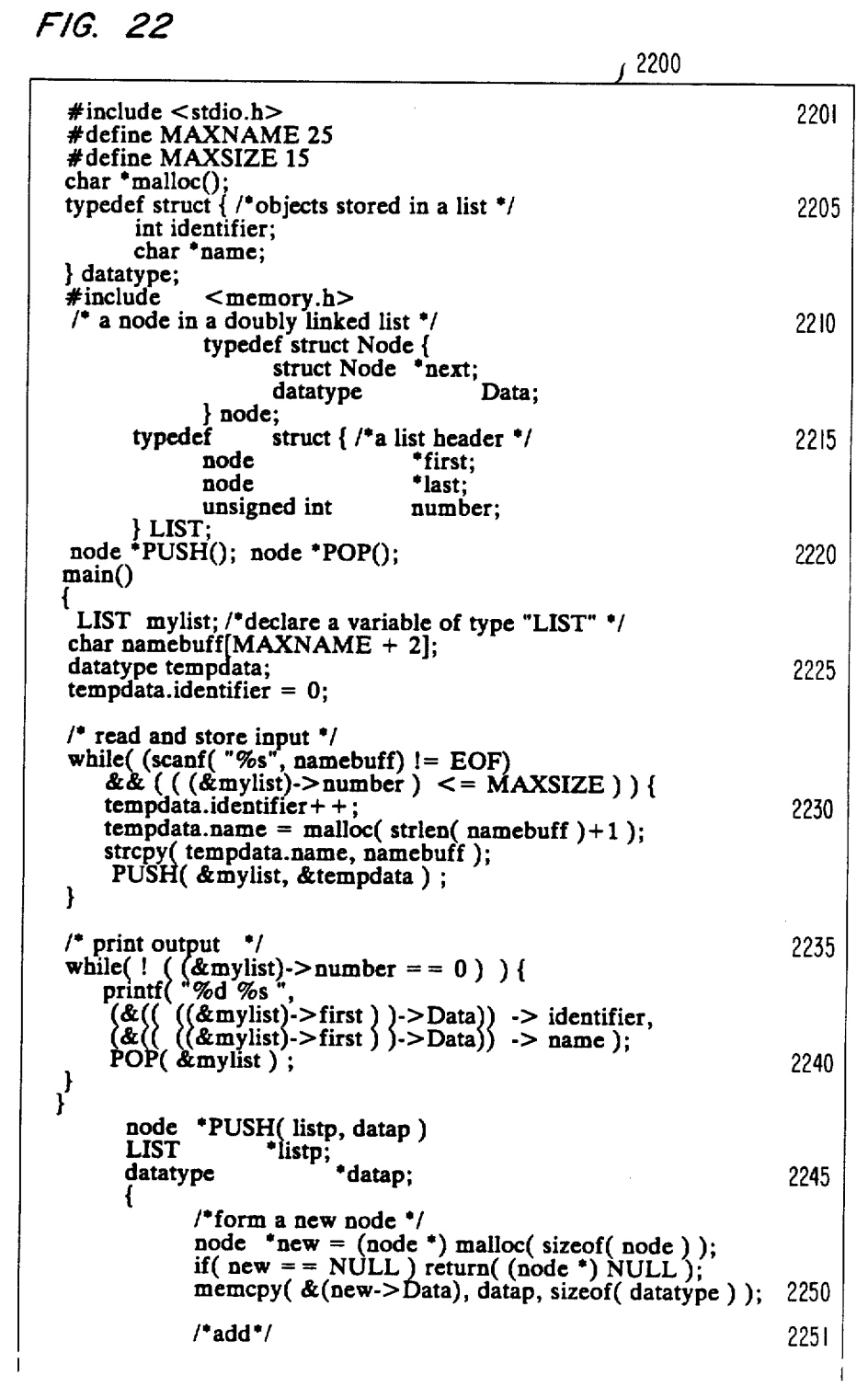

```
#include <stdio.h>
#define MAXNAME 25
#define MAXSIZE 15
char *malloc();
typedef struct { /*objects stored in a list */
        int identifier;
        char *name;
} datatype;
#include    <memory.h>
/* a node in a doubly linked list */
                typedef struct Node {
                        struct Node  *next;
                        datatype             Data;
                } node;
        typedef         struct { /*a list header */
                node                    *first;
                node                    *last;
                unsigned int            number;
        } LIST;
node *PUSH();  node *POP();
main()
{
 LIST  mylist; /*declare a variable of type "LIST" */
char namebuff[MAXNAME + 2];
datatype tempdata;
tempdata.identifier = 0;

/* read and store input */
while( (scanf( "%s", namebuff) != EOF)
    && ( ( (&mylist)->number )  <= MAXSIZE ) ) {
    tempdata.identifier++;
    tempdata.name = malloc( strlen( namebuff )+1 );
    strcpy( tempdata.name, namebuff );
     PUSH( &mylist, &tempdata ) ;
}

/* print output   */
while( !  ( (&mylist)->number == 0 )  ) {
    printf( "%d %s ",
    (&((  ((&mylist)->first ) )->Data))  -> identifier,
    (&((  ((&mylist)->first ) )->Data))  -> name );
    POP( &mylist ) ;
}
}
        node  *PUSH( listp, datap )
        LIST          *listp;
        datatype              *datap;
        {
                /*form a new node */
                node  *new = (node *) malloc( sizeof( node ) );
                if( new == NULL ) return( (node *) NULL );
                memcpy( &(new->Data), datap, sizeof( datatype ) );

                /*add*/
```

*FIG. 22 continued*

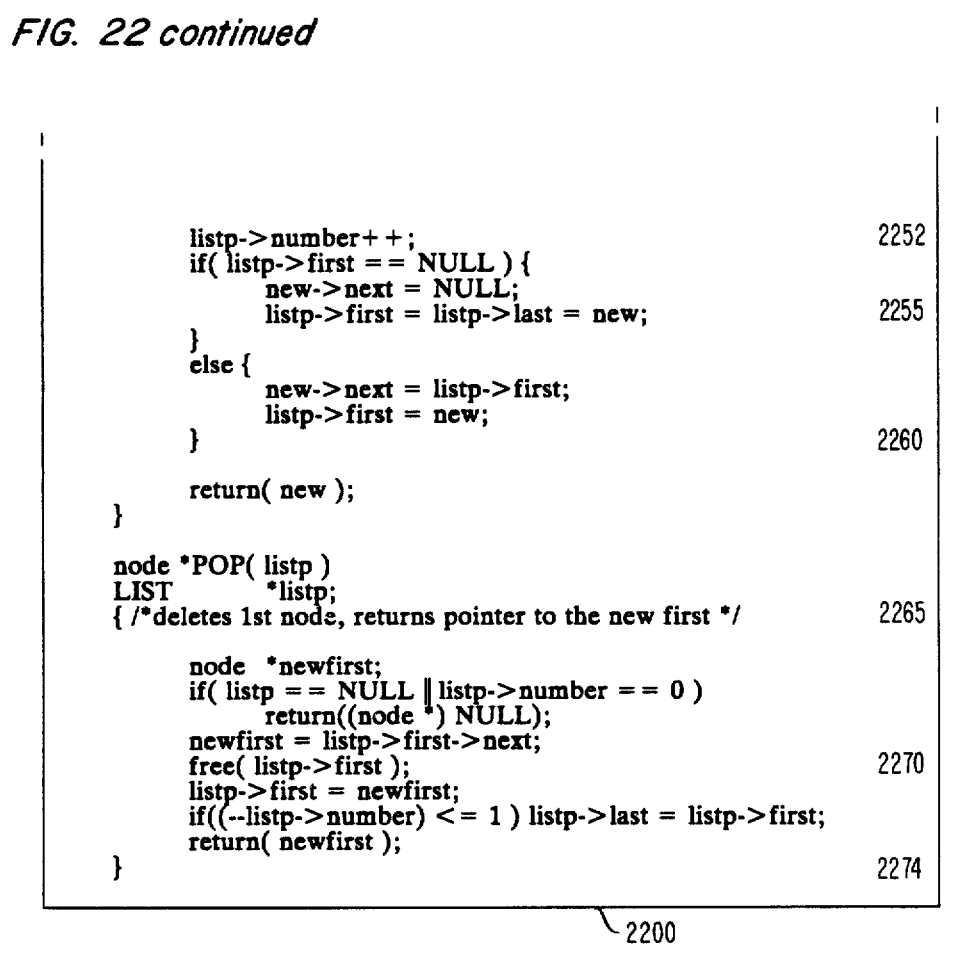

```
        listp->number++;
        if( listp->first == NULL ) {
                new->next = NULL;
                listp->first = listp->last = new;
        }
        else {
                new->next = listp->first;
                listp->first = new;
        }

        return( new );
}

node *POP( listp )
LIST        *listp;
{ /*deletes 1st node, returns pointer to the new first */

        node  *newfirst;
        if( listp == NULL || listp->number == 0 )
                return((node *) NULL);
        newfirst = listp->first->next;
        free( listp->first );
        listp->first = newfirst;
        if((--listp->number) <= 1 ) listp->last = listp->first;
        return( newfirst );
}
```

2200

SYSTEM FOR GENERATING SOFTWARE SOURCE CODE COMPONENTS

BACKGROUND OF THE INVENTION

This invention relates to software production systems and more particularly to such systems where certain portions of the software need to be generated several times.

A software system consists of several components, or modules, each performing a specific task. These components usually implement one or more functions, and/or are responsible for a certain structured piece of information that must be maintained, updated and retrieved in order for the software system, as a whole, to perform its overall task.

There are two categories of modules in a software system: (1) action modules that perform actions needed specifically for the task the system is designed to perform and (2) support modules that perform general data manipulation operations needed to support software modules of the first category. In a typical system, the majority of modules belong to the second, or support, category.

There exists a great deal of similarity between the support modules of different software systems. For example, all operating systems must, in some manner, maintain and manipulate stacks, queues and tables of items. The required operations for the manipulation of, say, a table of items are the same regardless of the items stored in the tables. However, a single operating system may be required to handle several independent tables, each containing items of different types. Also, different operating systems may manipulate different types of items, hence, requiring different tables for those items.

With the present state of the art in software development technology, modules of a software system are developed all from scratch. This is true in spite of the fact that most of the modules have been developed many times previously for other similar software systems. The reuse of previously developed software components is not presently possible since the existing software development tools do not allow the specification and production of generic modules. As the state of the art exists today, modules can be developed only to perform specific fixed actions on specific items of fixed type structured in a fixed format. As a result, a software module that supports, for example, a table of items of one type cannot be used to support a table of items of another type. Or, as another example, a module which employs a particular search strategy to find items in a table cannot be used if a different search strategy is desirable. Thus a need exists in the art for a system which allows the automatic generation of portions of the software according to the requirements specified by the software developers.

SUMMARY OF THE INVENTION

I have designed and developed a system that allows commonly used software components to be designed and developed only once, and reused many times in different systems with different contexts and different requirements. This is achieved by providing the capability for designers to specify a software component generically independent of the specifics of the context the component will be used in. When the module is to be integrated into a new system with the system's own specific requirements, my system automatically generates a concrete version of the module that fits the needs of the new system.

The system for software reuse consists of the following externally visible components:

1. A formal specification language that allows the specification of generic modules.

2. A compiler for the processing of specifications written in the specification language of item 1.

3. An instantiator for automatically generating many concrete software modules from the generic module, each to work in a given specific context based on the requirements of the context.

The logical entities manipulated by the system are called General Purpose Components (GPC). A GPC provides a collection of generic programming services. For instance, a GPC may provide all the operations and data definitions that are needed to maintain and manipulate a specific software table so as to store items of some particular type. The operations and definitions (collectively called "services") that this GPC provides are generic in the sense that they only capture the essence of operations and definitions of "tables", and are not specifically linked to any particular type of item nor to any particular method of manipulation. In their original form, therefore, these services cannot be used in any program.

These generic services, however, are made into concrete programming services by my system when the context and requirements of their intended environment are known. For example, when a programmer determines the type of items that are to be stored in a table, and passes this information to my system, a concrete or interpreted version of the GPC is automatically generated using the instantiator. This generated version of the software code looks exactly as it would if it would have been written by the programmer from scratch. This process of generating a concrete version from a generic version is called the instantiation process.

The same GPC can be used to instantiate a different concrete version for a different software system. Thus, my system allows for creating a software component once, and tailor-making it to suit different software systems automatically and as many times as desired.

BRIEF DESCRIPTION OF THE DRAWING

These and other objects and features, together with the operation and utilization of the present invention, will be more apparent from the illustrative embodiment shown in conjunction with the drawing in which FIGS. 2 through 16 show General Purpose Component (GPC) formats, FIGS. 17 through 21 show formats of typical GPC usage, and FIG. 22 shows an example output (generated program) of the system.

DETAILED DESCRIPTION

Figure 1:
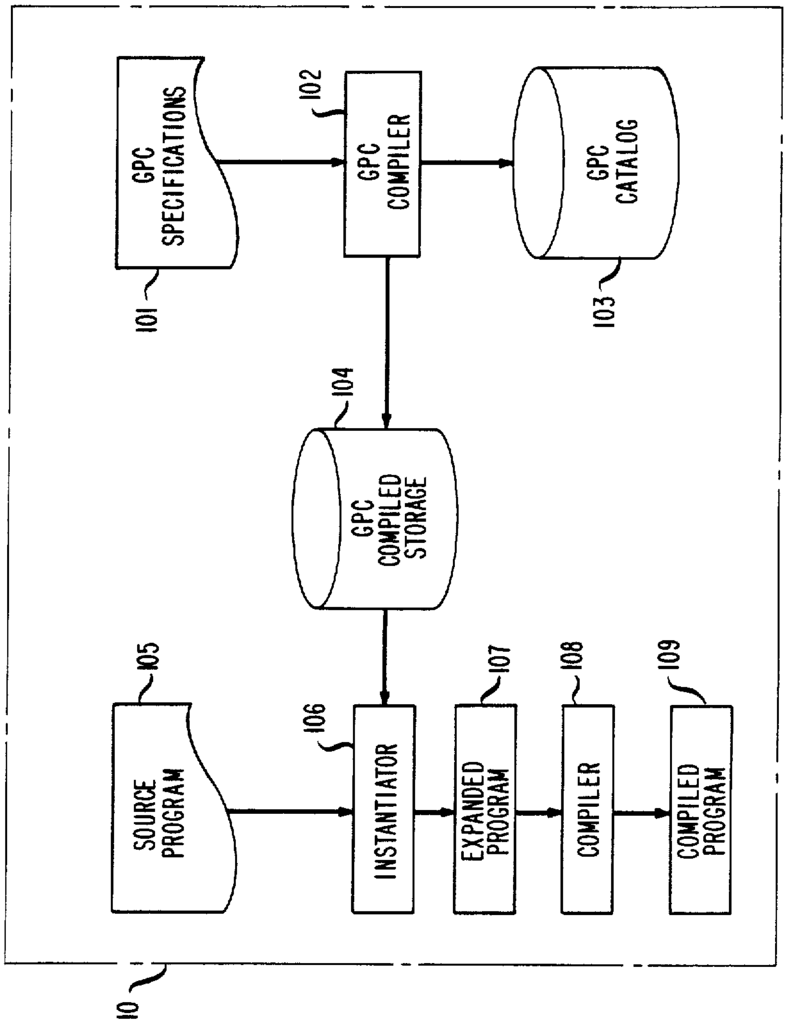
FIG. 1 is a block diagram showing my invention in a computer system.

As discussed above, and as shown in FIG. 1, the embodiment shown is used in conjunction with general purpose computer 10, such as the VAX11/780. It should be understood that the described system can be used on any computer, including personal computers such as the AT&T PC 6300.

Internally, the system consists of four interrelated components: a specification language which, as will be seen, enables the user to generate a General Purpose Component (GPC) specification 101, a GPC compiler 102 for the processing of the specification language, a storage area 104 for compiled GPC specifications, and an instantiator 106.

While not absolutely necessary, a user may find it convenient to extract from the GPC specifications the English descriptions of the GPCs, and store them in a separate data base 103 for future searching so that other users may find and use previously written GPC's.

The designer of a GPC uses the specification language to specify a GPC in a generic, context-insensitive fashion. The designer then stores the GPC specification in a file 101 within computer, and invokes GPC compiler 102 to process the file. This process results in the storage of the compiled GPC specification in a storage area 104.

The user of a GPC inserts proper invocation statements in the source program 105 being developed by the user. These invocation statements, as will be seen, cause the system first to generate appropriate program segments, and then to insert and/or amend the generated program segments to the user's program to create an expanded program 107. This expanded program is compiled by compiler 108 in the well-known manner and results in a compiled program 109, which, in turn, operates the computer.

THE SPECIFICATION LANGUAGE

Although my invention may be used with any computer language, the well-known C language will be assumed for explanation purposes. An explanation of such a language can be found in "The C Programming Language", B. W. Kernighan and D. M. Rithie, 1978, which publication is hereby cited as a reference herein. In the sequel, bold face characters are used to denote language keywords; italics denote user-provided strings; curly brackets "}" and "{", enclose optional entries; vertical bar "", separates alternatives; and %{and %} are keywords used for quotation.

The specification language is used to write GPC specifications. Each specification consists of three major parts: a description part, a declaration part, and a definition part. The general form of a GPC specification, thus, is shown in FIG. 2.

Anything that precedes the first %% is called the description part 201 and is ignored by the compiling process. However, the user of my system may wish to develop templates and standards so that descriptions can be mechanically processed and stored in a catalog 103. The declaration part 203 is a list of one or more declarations. A declaration may declare a "parameter", a "service", or a "hidden". The syntax for a parameter declaration is shown in FIG. 3, for a service declaration in FIG. 4 and for a hidden declaration in FIG. 5.

A parameter is something that the GPC user specifies whereas a service is something that the GPC will provide for the user. A parameter may be a type, a value (a constant such as one defining size of objects or error return codes), an option (used, for example, to choose between different algorithms), an operation (e.g., a hashing function or an error handling routine), or a prose (any text). A service may be a type, a value, an operation, or a prose. Hiddens will be explained later.

An identifier is a sequence of letters and digits that starts with a letter. The underscore character, "_", *counts as a letter. Upper and lower case letters are distinct. No more than the first twelve* (12) *characters are significant, although more may be used.*

A type is any C language type that can be used in the general form

```
type VariableName;
```

Examples for a type are: "int *", "float", "struct { int var1; long var2; }", and "MyType" where MyType has been previously defined as, for example:

```
typedef char * MyType( );
```

A value is any C language constant such as "25", "'033'", and "1.9E-6".

An option is any sequence of characters that corresponds to one of the predefined strings valid for the option.

An operation is a name that is syntactically equivalent to the name of a C language function. It has a type, cast.

A prose is a name of a text segment.

A hidden is a service that is not accessible by the user, but may be needed by one, or more, of the user-accessible services.

Examples of declarations are shown in FIG. 6.

The implementation part 205 of the GPC specification consists of one program for each declared service or hidden. The program instructs instantiator 106 what it must do when a call to the corresponding service is found in the user programmer's code. For example, the very simple program shown in FIG. 13 defines the actions of instantiator 106 in the situation where a call to the service "node" is detected. It instructs the instantiator 106 to define a C language type, and to name it whatever name the user specified for the service "node". The exact definition of the type depends on the linking strategy (singly or doubly) selected by the user.

The phrase "requires Always" states that, whenever "node" is instantiated, instantiator 106 must first make sure that another service, the one called "Always", has been already instantiated.

The optional phrase 'requires identifier' may be repeated more than once each time with a different value for identifier. Here an identifier must be the name of a hidden or another service.

There are only three instructions replace, header, and append, and one flow control construct if-then-else-endif.

Instructions are executed in the same sequence they are written except, of course, when they are grouped by the if-then-else-endif constructs.

The replace instruction has the general form shown in FIG. 8. When the replace instruction is executed, instantiator 106 replaces the text of the call by the given C language segment. The text of the call for an operation is the starting dollar sign, the name of the service, the ending dollar sign, and the left and right parentheses together with what is in-between. For other services, the text of the call is the name of the service and the enclosing pair of dollar signs. For obvious reasons, this instruction is not allowed for hiddens.

During the replacing process, all the characters in a C language segment are transferred to the output unchanged except for the following cases:

- A sequence of the form \$Name\$ is transformed into \$Name\$. (This allows specifying GPCs in terms of other GPCs.)
- A sequence of the form \$Name\$ is taken to be a reference (not a service call) to a service with the generic name "Name", and is simply transformed into the user defined name for that service.

A sequence of the form $0$ is transformed into the user-known name of the service whose program is being specified.

For operation services of type operation, a sequence of the form $n$, where n is a number between 1 and 20, is taken to be a reference to the (expanded) text of the nth argument of the service call; the sequence is transformed into the corresponding string. Notice that arguments of a service call may themselves be service calls.

The append instruction has the general form shown in FIG. 9. When this instruction is executed, instantiator 106 appends the given C language segment to the (current) end of the user source file. The transformations of $n$ and $Name$ strings are also performed on the C language segment. If qualifier multiple is present, the C language segment is appended every time a service call is processed; if once is present, or if there is no qualifier at all, the C language segment is appended at most once.

The header instruction has the general form shown in FIG. 10. When this instruction is executed, instantiator 106 inserts the given C language segment in the user source file at the location of the corresponding GPC request line (or after the last inserted C language segment of other header instructions of the same GPC). The processing of the C language segments are as described above.

The if-then-else-endif control flow construct has the general forms shown in FIG. 11. In the form 1101, the "instructions" are executed if and only if "condition" is true. In the form 1102, the instructions between keywords then and else are executed if and only if "condition" is true, and instructions between keywords else and endif are executed if and only if "condition" is not true. An if-then-else-endif construct is syntactically equivalent to an instruction and, therefore, can appear within the if- or else-block of another if-then-else-endif construct. The endif ambiguity is resolved by connecting an endif with the last encountered if.

A "condition" has the general forms shown in FIG. 12. "Identifier" is the generic name of a service or a parameter. Forms 1201 and 1202 test whether the user has overridden the default value of the given parameter or service; if the user has specified a value different from the default, the first condition is true (and the second is false), otherwise the first condition is false (and the second is true).

Forms 1203 and 1204 test the value of the given parameter or service against the given string; "==" denotes equality and "!=" denotes inequality.

In the example of FIG. 13, line 1302 instructs instantiator 106 to replace the user-known name of this service by the content of the segment enclosed in the pair %{and %}. In this case, the replacing text is simply the user-known name itself (designated by $0$); that is, this instruction is indeed an "echo" instruction.

Instruction 1303 uses the if-then-else-endif construct to divide the control flow into two paths corresponding to whether the option SINGLY is requested by the user or not. The difference is in how the type with generic name "node" is defined. In either case, there is only one instruction, a header instruction, that has to be executed by instantiator 106. The result of performing a header instruction is to insert in the user file the given segment at the line in which the GPC was requested. $Data$ and $node$ refer to the user names for the parameter "data", and the service "node", respectively. The qualifier once indicates that the insertion of the segment must be done at most once no matter how many times the service "node" is called. Once is the default value which can be overridden by the qualifier multiple.

Recall that there was another class of objects that could be mentioned in a GPC's declaration part, namely those declared as hidden. A hidden is a service that the user programmer is not aware of, but that is used to implement one or more of the other services or hiddens. The instantiation of a hidden is always invoked by means of the requires mechanism. In our example, the program for the hidden "Always" declared in line 606 is shown in FIG. 14.

An interesting feature of the GPC specification language corresponds to how services of type operation can be utilized. A GPC designer may specify an operation that takes a C language segment as one of its parameters. For example, the designer may specify the operation "forall" that takes a list, a name to represent data in each element of the list, and a segment of code as its parameters, and executes the segment for all elements in the list from the first to the last. The specification of such an operation may be as shown in FIG. 16.

The Compiler

GPC Compiler 102 is responsible for translating a GPC specification into a format suitable for the instantiator 106. It reads a GPC specification and checks to make sure it is syntactically sound. The checks performed by the GPC Compiler include:

All statements in the specification are syntactically correct.

Every declared service and hidden is properly defined.

There is no dependency loops. If a service or hidden requires the instantiation of another service or hidden, the latter does not requires the instantiation of the former directly or indirectly via a chain of requires commands.

If GPC Compiler detects any anomalies, it so informs the GPC designer by printing error messages. Otherwise, it constructs a symbol table and a parse tree in the well-known manner similar to other compilers, and stores them in the storage area for compiled GPCs 104. This information will later be used by instantiator 106 to generate expanded programs 107.

It must be noted that the GPC Compiler does not generate machine code as is generally the case with ordinary compilers. The output of the GPC Compiler, instead, is an encoded (binary) representation of the specification which, as will be seen later, is used by the instantiator to generate program segments.

Use of GPC's

A user programmer about to start the implementation of a new software program searches the GPC catalog 103 looking for GPC(s) that can be used in the program to be developed. If found, the user programmer inserts "request line"s in the program naming the GPC(s) needed, and providing information regarding the context in which each GPC will operate. These request lines may be thought of as "indirect" statements since they will not be passed to compiler 108, whereas, statements that are passed to compiler 108 unchanged can be thought of as direct statements.

In a typical GPC request line, the user specifies the values of parameters as well as the names by which the services are to be known. A GPC request line has the general form shown in FIG. 17.

Args is a comma-separated list of "argument-name=argument-value" pairs that corresponds to parameters and services of the GPC.

Assuming that the GPC is called "listhndlr," FIGS. 18 and 19 show two GPC request lines.

In the first case (FIG. 18), "MyElementType" is assumed to be the name of a type previously defined by the user by means of the typedef construct of C language. The GPC will provide, among other services, the definition of a type called "MyListType," and an operation called "ADD." In the second case (FIG. 19), the definition of "data" is taken to be that of the given structure, and the services provided by the GPC are called by their default names.

The user may assume that the services provided by listhndlr are properly defined, and are available for use anywhere in the compilation module after the GPC request line. The user can use the services by "service calls". A service is called by mentioning its user-known name enclosed in a pair of dollar signs ($). For instance, FIG. 20 (corresponding to the GPC request line in FIG. 18) calls the services "list" and "addafter".

As an example, let us assume that the user wants to use the listhndlr GPC in a program that reads one name per input line, and prints the names and their relative positions in the input stream in a reversed order: first name entered is printed last. The corresponding user source program may look like the program shown in FIG. 21. Note that lines 2109 through 2116 form a GPC request line, and lines 2119, 2125, 2129, 2132, 2134, 2135, and 2136 each contains a GPC service call.

The Instantiator

Instantiator 106 is responsible for generating tailor-made programs or program segments according to both the (compiled) GPC specification and the requirements of the GPC request line. Instantiator 106 first scans the user source program 105 searching for any GPC request lines. If found, it extracts the name of the GPC and locates the corresponding (compiled) specification in the compiled GPC storage area 104. Instantiator 106 then binds the values specified by the user to the generic parameters declared by the GPC designer. This results in a concrete version of the GPC specification in which all generic parameters have concrete values associated with them.

The above process is performed once for each GPC requested even if there are several requests for the same GPC (note that a user may request the same GPC several times, each time with a different set of values for the generic parameters).

Instantiator 106 also scans the user source program searching for any service calls. If a service call is located, instantiator 106 consults its internal tables to determine which GPC has the definition of the service. It then locates the definition (which, in general, is in terms of generic parameters) as well as the corresponding values for the generic parameters, and executes the definition statement by statement. This may result in changing parts of the user program, substituting parts of the user program with program segments, inserting program segments in different sections of the user program, or generating completely new programs and appending them to the user program. The exact nature of these actions, of course, is determined by the corresponding definition of the service in the GPC specification.

Finally, instantiator 106 creates an expanded file 107, and stores in that file the resulting generated source program 107.

The output (expanded program 107, FIG. 1) of instantiator 106 corresponding to the program of FIG. 21 is shown in FIG. 22. Notice that instantiator 106 has changed the source file in several ways. It has assembled two typedef phrases, and has inserted them at the line the GPC was requested. A line containing "#include <memory.h>" has been added (line 2209). All service calls in the user source file have been replaced. In particular, note that for the operations "PUSH" and "POP" complete programs have been created and added to the user code (lines 2243 to 2262 and lines 2263 to 2274, respectively), whereas operations "GET," "TOP," "isempty," and "howmany" are simply replaced by program segments (lines 2229, 2233, 2236, 2238, 2239, and 2240).

The expanded program (FIG. 22) is now the same as it would have been if the user wanted to take the time and effort to design and write the source program in its entirety from scratch. However, since GPC's need only be designed once for a given family of modules, it can be assumed that the designer can afford to take the time to create a well-designed module thereby resulting in very efficient source code. Another aspect of the reusable GPC modules is the reduction of overall software production costs such as reduction of debugging time, reduction in code modification time as well as reduction in code writing time for subsequent uses.

Other Applications of the System

The system described here can also be used in applications other than software reuse described so far. In fact, any application in which variations of a generic component must be produced to fit specific needs can benefit from my invention.

To utilize my system in such applications, one uses the GPC specification language to design a generic component, and then uses the instantiator to generate many specific versions of the component.

As an illustrative example, consider the case where a bank wants to send letters to its customers regarding their credit standings. In such a situation, a GPC designer may specify a "general purpose letter" with such generic parameters as the name of the customer, whether the customer is an individual or a company, the length of time the customer has been with the bank, the customer's present and past credit standings, a variable reflecting the current policy of the bank, etc.

Different personalized letters are composed by the instantiator depending on the combination of all values assigned to these generic parameters for each customer.

For instance, different compositions of the letter may be generated for customers with satisfactory present but unsatisfactory past credit standing, and customers with satisfactory credit standings both present and past.

The possibilities are limitless and, depending on how sophisticated the corresponding GPC is specified, may range from a few standard formats to a large variety of truly personalized compositions all using the same general purpose letter.

What is claimed is:

1. A system for generating concrete software programs from supplied generic specifications, said system comprising a compiler for compiling language statements specifying generic software components, each specified generic software component corresponding to one or more user requestable programming services, and each of said programming services being specified by a collection of language statements, means responsive to said compiler for storing the compiled language statements specifying said generic software components, means having an input for receiving language statements specifying a particular software application, the language statements specifying said particular software application including at least one indirect statement and at least one request statement, each indirect statement naming any one of said specified generic software components and each request statement naming one user requestable programming service in one named generic software component, said receiving means including first means responsive to each indirect statement for locating the stored language statements specifying the one generic software component named in that indirect statement, second means responsive to each request statement for locating the collection of language statements specifying the user requestable programming service named in that request statement in the stored language statements located by said first means, and means responsive to the collection of language statements located by said second means for creating a concrete version of said particular software application wherein said concrete version is devoid of indirect and request statements.

2. The system set forth in claim 1 wherein each generic software component in a portion of said specified generic software components has at least one assoicated parameter and the indirect and request statements of said particular software application respectively include at least one second indirect statement and at least one second request statement, each second indirect statement names any one generic software component in said portion and specifies a value for each associated parameter and each second request statement names one user requestable service in one named generic software component in said portion, and wherein said receiving means further includes third means responsive to each second indirect statement for correlating the stored language statements located by said first means which specify the generic software component named in that second indirect statement and the value of each associated parameter, and said creating means creating said concrete version of said particular software application also in response to the correlated language statements.

3. The system set forth in claim 2 wherein said particular software application contains a plurality of indirect statements each referencing an identical generic software component in said portion and specifying different values for an identical associated parameter, and wherein said receiving means includes means for establishing a plurality of different instances of said identical generic software component referenced by said plurality of indirect statements, and means for establishing different names for an identical user requestable service provided by each instance of said identical generic software component.

4. The system of claim 1 wherein said collection of language statements specifying said particular software application may include instructions for inserting indirect statements and request statements referencing an identical or a different generic software component, and wherein said receiving means includes means for monitoring the language statements located by said second means for instructions for inserting indirect and request statements and for reapplying said language statements located by said second means to said input of said receiving means.

5. A system for expanding a collection of language statements under control of a set of instructions written in a transformation language having language statement-to-language statement constructs, said system having means for storing general purpose components, each of said general purpose components corresponding to one or more user requestable transformations, each transformation being specified by a collection of transformation language statements, means for receiving a collection of user language statements including at least one context specifier statement and at least one request statement, each context specifier statement naming any one of said stored general purpose components and each request statement naming one user requestable transformation in one named general purpose component, said receiving means including means responsive to each context specifier statement for locating the general purpose component named in that context specifier statement in said stored general purpose components, means responsive to receipt of each request statement for locating the user requestable transformation named in that request statement in any general purpose component located by said first means, and means controlled by each located transformation for creating an expanded version of said user-supplied language statements.

6. The system of claim 5 wherein each generic software component in a portion of the stored generic software components has at least associated parameter and said context specifier and request statements respectively include at least one second context specifier statement and at least one second request statement, each second context specifier statement names any one generic software component in said portion and specifies a value for each associated parameter and each second request statement names one transformation in one named generic software component in said portion, and wherein said receiving means further includes means responsive to each second context specifier statement for correlating each stored generic software component named in that second context specifier statement and the value of each associated parameter, and said creating means creating said expanded version of said user-supplied language statements also in response to each correlated generic software component.

7. The system set forth in claim 6 wherein said user-supplied input statements contain a plurality of context specifier statements each referencing an identical generic software component, each such context specifier statement specifying a different set of parameter values, and wherein said receiving means includes means for establishing a plurality of different instances of each identical generic software component and means for distinguishing between an identical transformation provided by said instances of each identical generic software component.

8. An operating arrangement for use in a computer system in which a program including source code language statements is passed through a conversion process to generate a machine language version of said program, said operating arrangement comprising a memory;

means for storing general purpose software components in said memory, each of said general purpose components corresponding to one or more user requestable transformations, and each transformation being specified by a collection of language statements such that any one of said general purpose components may control an expansion of user-supplied input language into other language statements, instantiator means having an input for receiving a source code program, said program including at least one context specifier statement and at least one request statement, each context specifier statement naming a particular one of said general purpose components and each request statement naming a particular transformation in one named general purpose component, said instantiator means including first means responsive to each context specifier statement for locating in said memory the stored general purpose component named in that context specifier statement, second means responsive to each request statement for locating the collection of transformation language statements specifying the transformation named in that request statement in one general purpose component located by said first means, means responsive to the collection of transformation language statements located by said second means for creating a concrete version of said source code program, and compiler means for converting said concrete version of said source code program into a machine code version of said source code program.

9. The operating arrangement of claim 8 wherein each general purpose component in a portion of the stored general purpose components has at least one associated parameter and the context specifier and request statements received by said instantiator means respectively include at least one second context specifier statement and at least one second request statement, each second context specifier statement names one general purpose component in said portion and specifies a value for each associated parameter and each second request statement names one transformation in one named general purpose component in said portion, and wherein said instantiator means further includes third means responsive to each second context specifier statement for correlating the general purpose component named in that second context specifier statement and located by said first means and the value of each associated parameter, and said creating means also creating said concrete version in response to each correlated general purpose component.

10. A method for generating software programs from supplied generic specifications, said method comprising the steps of compiling received language statements specifying generic software components, each of said generic software components corresponding to one or more user requestable services for program generation, each said service being specified by a collection of language statements, storing the compiled language statements of said specified generic software components, receiving language statements specifying a particular software application, said language statements including at least one indirect statement and at least one request statement, each indirect statement naming any one of said specified generic software cmponents and each request statement naming one user requestable programming service in one named generic software component, said receiving step further including the steps of locating in response to each indirect statement the stored language statements specifying the generic software component named in that indirect statement, locating in response to each request statement the collection of language statements specifying the user requestable programming service named in that request statement in the stored language statements that have been priorly located in response to each indirect statement, and creating in response to the located language statements specifying the user requestable programming service named in each request statement a concrete version of said particular software application wherein said concrete version is devoid of indirect and request statements.

11. The method of claim 10 wherein each generic software component in a portion of said specified generic software components has at least one associated parameter and the indirect and request statements of said particular software application respectively include at least one second indirect statement and second request statement, each second indirect statement names any one generic software component in said portion and specifies a value for each associated parameter and each second request statement names one user requestable service in one named generic software component in said portion, and wherein said receiving step further includes the step of correlating in response to each second indirect statement the stored language statements which specify the generic software component named in that second indirect statement and the value of each associated parameter; and wherein said creating step creates said concrete version of said particular software application also in response to correlated language statements.

12. The method set forth in claim 11 wherein said particular software application contains a plurality of indirect statements, each of said indirect statements referencing an identical generic software component in said portion and specifying a different value for each associated parameter.

13. The method set forth in claim 11 wherein said collection of language statements may include instructions for inserting indirect statements and request statements which reference identical or different generic software components, and wherein said receiving steps includes the step of monitoring said language statements specifying said particular software application of instructions for inserting indirect and request statements and reapplying such instructions through said receiving step.

* * * * *

UNITED STATES PATENT AND TRADEMARK OFFICE

CERTIFICATE OF CORRECTION

PATENT NO. : 4,734,854

DATED : March 29, 1988

INVENTOR(S) : Siroos K. Afshar

It is certified that error appears in the above-indentified patent and that said Letters Patent is hereby corrected as shown below:

Column 3, lines 67-68 the print is smaller than the rest of the text.

Column 4, line 4, the print is smaller than the rest of the text;

Column 4, line 9, the print is smaller than the rest of the text;

Column 4, line 11, "033" should read --\033--;

Column 4, line 62, "$Name$" should read --\$Name$--;

Column 10, line 38, "least" should read --least one--.

Column 12, line 63, "of" should read --for--.

Signed and Sealed this

Eighteenth Day of January, 1994

Attest:

Bruce Lehman

BRUCE LEHMAN

*Attesting Officer* *Commissioner of Patents and Trademarks*